United States Patent [19]
Nakanishi et al.

[11] Patent Number: 5,822,224
[45] Date of Patent: Oct. 13, 1998

[54] LOAD WEIGHT MONITORING SYSTEM FOR DUMP TRUCK

[75] Inventors: Hitoshi Nakanishi, Oyama; Nobuki Hasegawa, Tokyo; Hiroshi Shimura, Yokohama, all of Japan

[73] Assignee: Komatsu Ltd., Tokyo, Japan

[21] Appl. No.: 875,830

[22] PCT Filed: Jan. 29, 1996

[86] PCT No.: PCT/JP96/00161

§ 371 Date: Jul. 31, 1997

§ 102(e) Date: Jul. 31, 1997

[87] PCT Pub. No.: WO96/24031

PCT Pub. Date: Aug. 8, 1996

[30] Foreign Application Priority Data

Jan. 31, 1995 [JP] Japan ................................. 7-032801

[51] Int. Cl.$^6$ .................................................. G01G 19/40
[52] U.S. Cl. .......................... 364/567; 455/62; 455/500
[58] Field of Search ........................... 455/463, 500–73, 455/550, 566, 62–68; 177/25.19, 136; 364/567

[56] References Cited

U.S. PATENT DOCUMENTS

| | | | |
|---|---|---|---|
| 4,066,964 | 1/1978 | Costanza et al. | 455/65 |
| 4,630,227 | 12/1986 | Hagenbuch | 364/567 |
| 4,921,578 | 5/1990 | Shiraishi et al. | 177/25.19 |
| 5,551,063 | 8/1996 | Brandon et al. | 455/509 |
| 5,566,388 | 10/1996 | Brame et al. | 455/520 |
| 5,701,590 | 12/1997 | Fujinami | 455/62 |
| 5,714,719 | 2/1998 | Otsuka et al. | 177/25.11 |

FOREIGN PATENT DOCUMENTS

| | | |
|---|---|---|
| 4335479 | 5/1994 | Germany . |
| 59-107217 | 6/1984 | Japan . |
| 61-28826 | 2/1986 | Japan . |
| 6-76198 | 3/1994 | Japan . |
| 6-82295 | 3/1994 | Japan . |

*Primary Examiner*—James P. Trammell
*Assistant Examiner*—Craig Steven Miller
*Attorney, Agent, or Firm*—Sidley & Austin

[57] ABSTRACT

The present invention enables a reliable radio communication between a plurality of dump trucks and loaders, improves operability, and can flexibly cope with movement of the dump truck during the loading operation. To this end, a loader selecting means (2) is provided for each dump truck, and a plurality of channels are provided for each dump truck controller (6) and each loader controller (35), the dump truck controller (6) inputs a loader selection signal from the loader selecting means (2), and selects, from a plurality of channels, a channel available for communicating with the loader controller (35) corresponding to the loader selection signal to transmit a load weight value, and the selected loader controller (35) receives the load weight value on the channel available for communications, and displays the received load weight value on a weight display means (32).

14 Claims, 11 Drawing Sheets

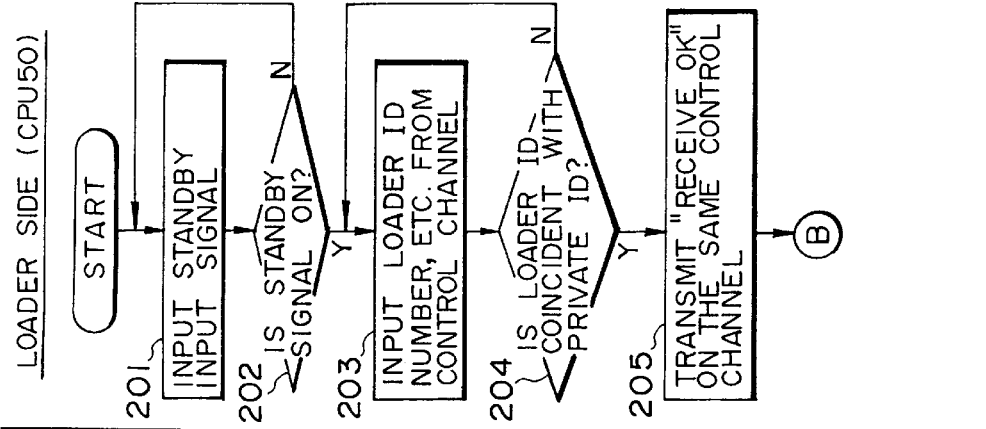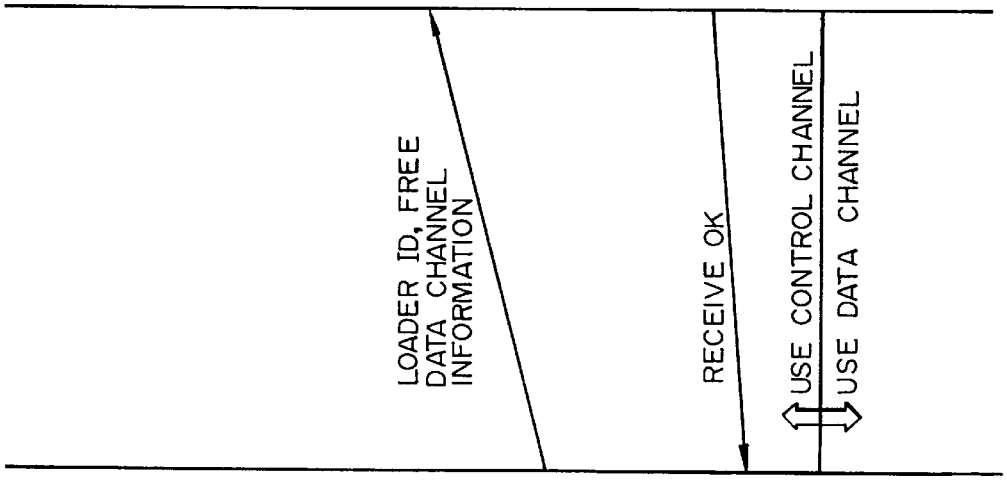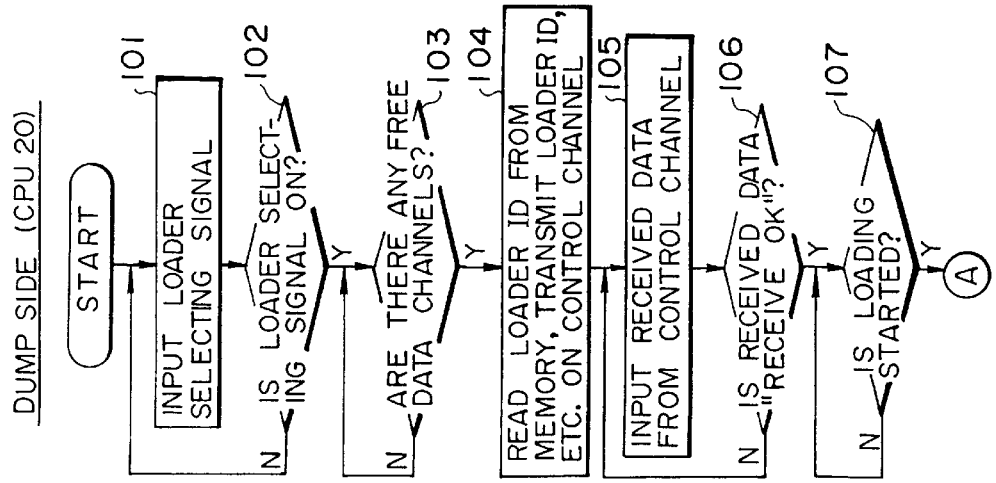

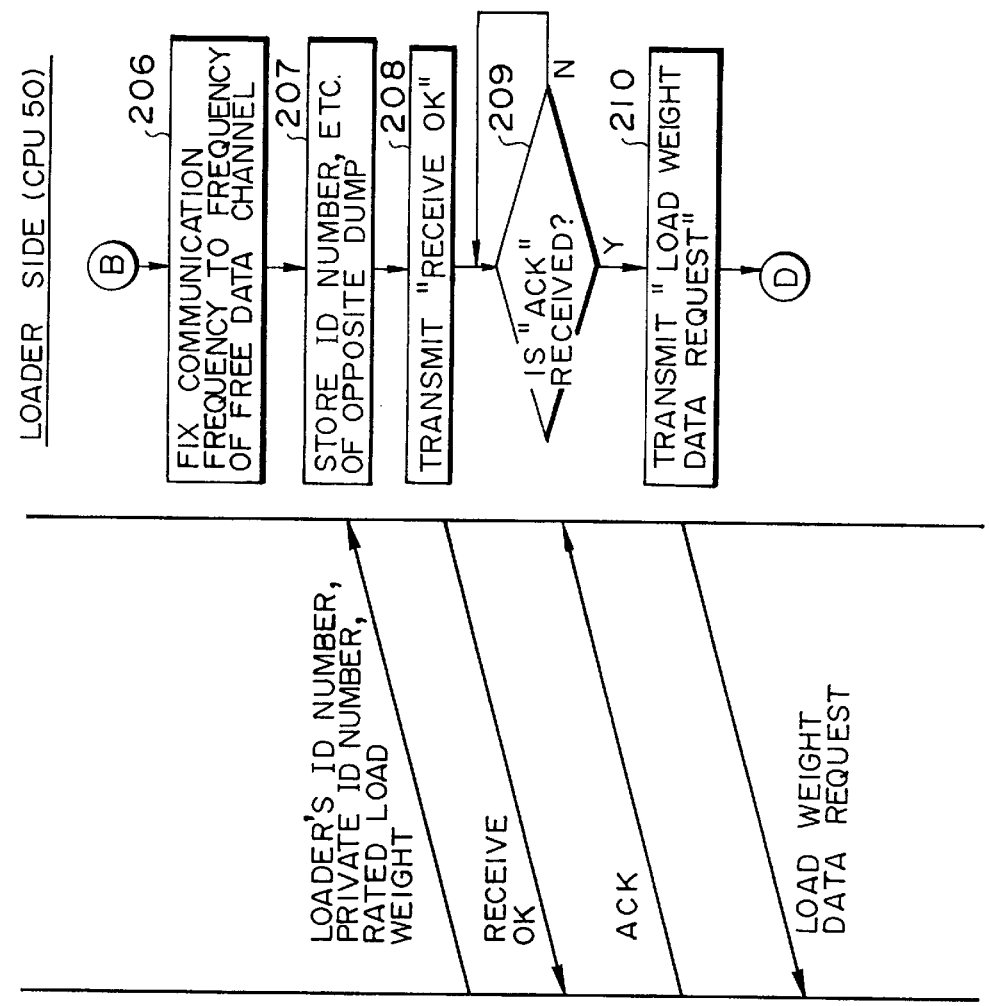

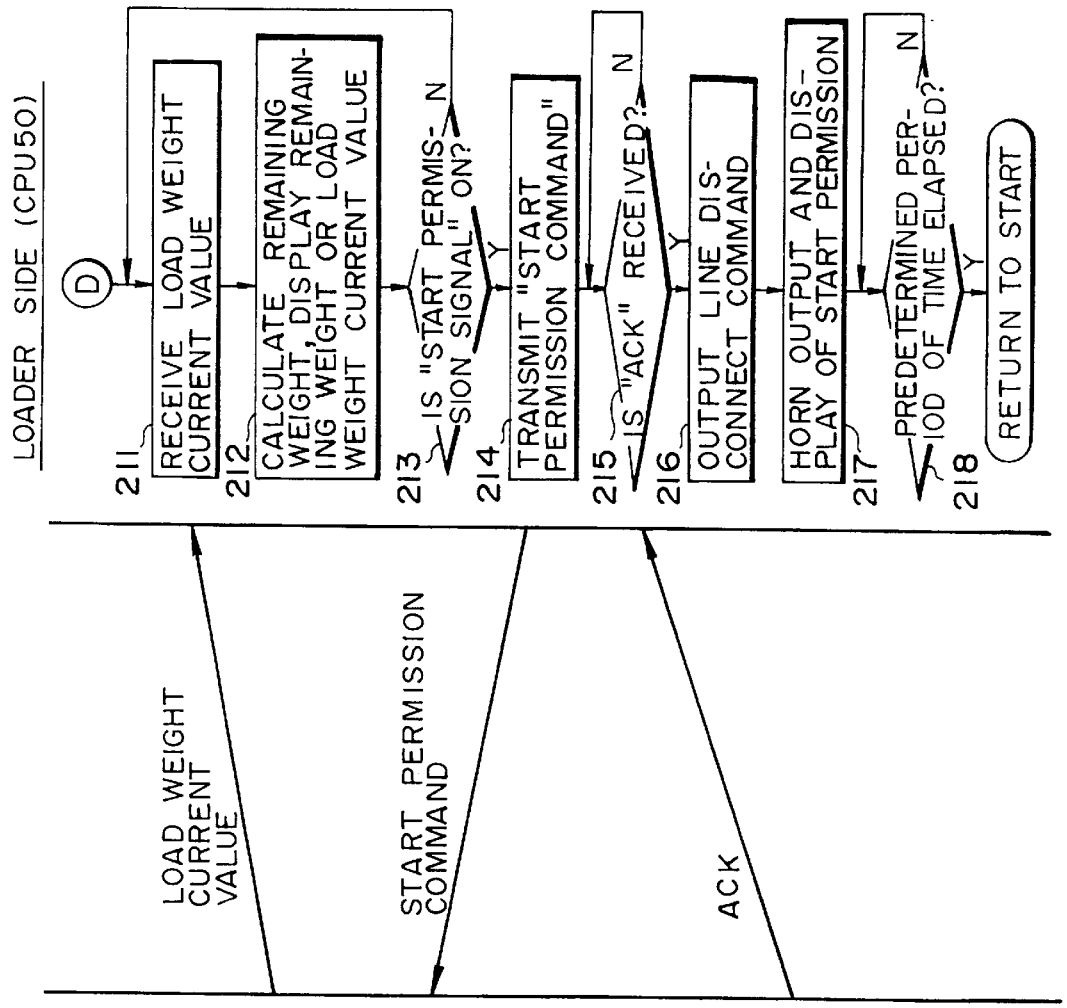

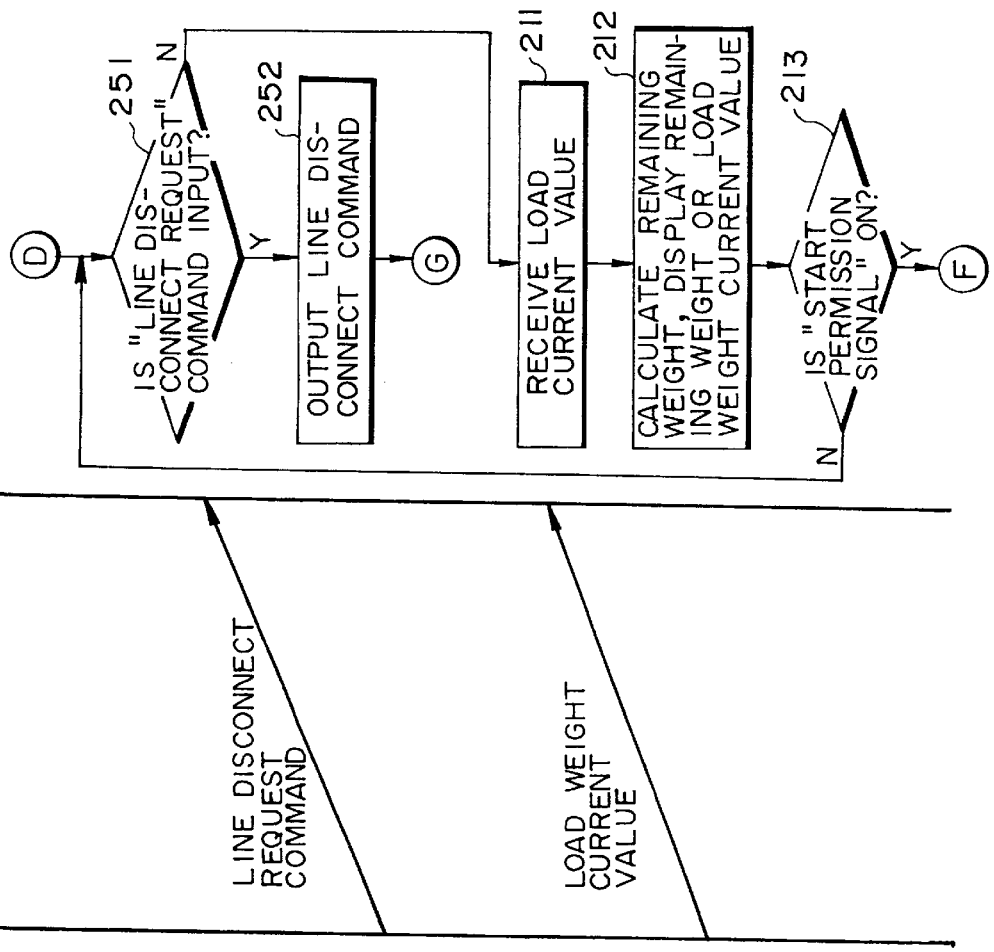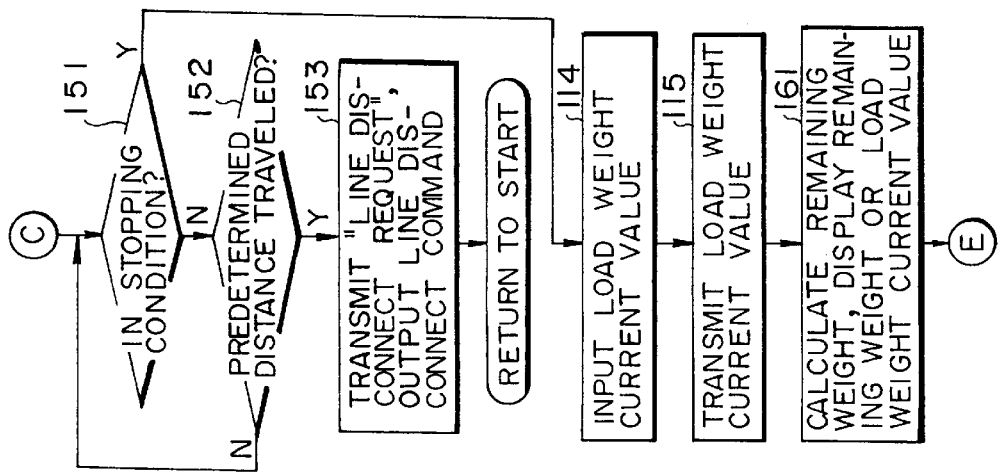

LOAD WEIGHT MONITORING SYSTEM FOR DUMP TRUCK

TECHNICAL FIELD

The present invention relates to a load weight monitoring system for monitoring the load weight of a dump vehicle (hereinafter, referred to as a dump truck) from a loading operation vehicle (hereinafter, referred to as a loader), and more particularly, to a load weight monitoring system for a dump truck for use in a system in which a plurality of dump trucks and a plurality of loaders operate in cooperation.

BACKGROUND ART

In a field, such as a quarry, where a plurality of dump trucks and loaders are systematically operated within a relatively wide working area, they usually operate in cooperation with each other. For example, when a dump truck without a load enters the quarry and stops near an operator-waiting loader, the loader loads stones, rocks, earth, and/or sand on a bed (hereinafter, referred to as a body) of the dump truck. After loading up to a maximum allowable load weight (hereinafter, referred to as a rated load weight), an operator of the loader sends a signal of load completion with a horn, etc., to an operator of the dump truck, and waits for the next dump truck without a load to arrive. The operator of the dump truck carries the loaded stones, rocks, earth, sand, etc., to a predetermined earth dumping field to discharge them, and then returns to the quarry to repeat the above operating procedure.

In a field where dump trucks and loaders are thus systematically operated, it is desirable to secure a maximum production by increasing the driving efficiency of the dump trucks and loaders. Thus, it is necessary to increase the amount that a dump truck carries at one time.

On the other hand, when the dump truck travels in a condition in which the rated load weight is exceeded, i.e., in a so-called overloaded condition, the weight greatly influences the durability of each part of the vehicle such as the vehicle body, the wheel mounting portions, and the suspension. For this reason, when traveling in an overloaded condition, the dump truck must travel at a limited vehicle speed corresponding to the overload amount, so the driving efficiency does not increase very much.

For reasons as described above, in order to obtain the maximum load weight that the dump truck can carry at one time, the operator of the loader has conventionally performed a loading operation while monitoring the load weight so that the load weight approaches as close as possible to the rated load weight of the dump truck. As an example of such a load weight monitoring system, Japanese Unexamined Patent Publication No. 6-82295 has been proposed. The load weight monitoring system includes a controller for calculating the load weight, a load weight display for displaying the calculated load weight, and a transmitter for transmitting the load weight as a signal, each provided on the dump truck. In addition, in a driver's cab on the loader, a receiver for receiving the above load weight signal and a display section for displaying the received load weight are provided.

The controller on the dump truck opens a communication link when the load weight of the dump truck changes by a predetermined weight value or more due to a first loading, and thereafter keeps on transmitting the load weight signal, and disconnects the communication link when the transmission shift lever is moved from neutral to a position other than neutral. The receiver on the loader displays the received load weight signal on the display section when the communication link is open, and switches the weight display to another display when the communication link is disconnected. In this way, the operator on the loader can learn the load weight by watching the display section, and makes a sign of load compilation to the operator on the dump truck by means of a horn, etc., provided on the loader.

However, in the above load weight monitoring system, since the same single fixed frequency is used as the radio frequency on the dump truck and on the loader, interference often occurs when a plurality of dump trucks and loaders operate simultaneously in cooperation with each other. For this reason, communication links among other vehicles are disconnected in order to avoid the interference, and opening of the communication links is deferred, so that dead time is produced. In addition, when a communication link is opened, it should be checked as to whether or not the desired loader is reliably connected to the communication link, so that a problem causing troublesome work is encountered.

In addition, since a current load weight value is displayed on the display section on the loader, the loader operator must calculate the remaining weight needed to reach the rated load weight from the current load weight value, and must consider how much should be loaded before the loading is completed. This is troublesome work for the loader operator, thus offering low operability. When judging a load completion, the loader operator makes a sign to the dump truck operator by sounding a horn, etc., on the loader, but the sound may be inaudible in a high-noise field environment. A voice radio can be separately used in place of the horn to directly check between the operators, but it is expensive, and a troublesome operation is required, such as tuning the voice radio frequency on the dump truck to the voice radio frequency on the respective loader.

In addition, the dump truck operator may decide to complete the loading and start the dump truck before the load weight reaches the rated load weight. To this end, in the load weight monitoring system, the communication links can be disconnected when the transmission shift lever is moved, from neutral to a position other than neutral, upon a starting of the dump truck. However, due to the communication link disconnection, the monitoring system cannot cope with an operation such that the dump trucks and the loaders perform loading while alternately repeating forward and reverse movements, i.e., a so-called cross loading operation. This is because the transmission shift lever is moved from neutral to a position other than neutral upon a starting of the dump truck while the cross loading operation is performed, so the communication links are disconnected. Therefore, since the latest load weight cannot be displayed on the display section on the loader, the weight cannot be controlled in such a manner as to approach the rated load weight.

SUMMARY OF THE INVENTION

The present invention has been made to solve the problems of the prior art, and its object is to provide a load weight monitoring system for a dump truck which can reliably monitor, from a loader, the load weight of a dump truck to achieve an improvement in operability for the operators for the dump truck and the loader even if a plurality of dump trucks and loaders operate simultaneously in cooperation with each other, and which can flexibly cope with free movement of the dump trucks during the loading operation.

In a first aspect of a load weight monitoring system for monitoring simultaneous loading operations of a plurality of dump trucks and a plurality of loaders according to the present invention, there is provided: a load weight monitoring system for a dump truck including a dump truck controller, provided for each of the plurality of dump trucks; a loader controller, provided for each of the plurality of loaders and available for communicating by radio with a dump truck controller; a weight detector, provided for each loader, to detect the load weight of a respective dump truck; and a weight display means, provided for each loader, to display the load weight through a dump truck controller and a loader controller; the system comprising:

a loader selecting means, provided for each dump truck, to select any one of the plurality of loaders; and a plurality of channels provided for each dump truck controller and said each loader controller, wherein the dump truck controller inputs a loader selection signal from the loader selecting means, selects from a plurality of channels of the dump truck controller a channel available for communications with the loader controller corresponding to the loader selection signal, and transmits a load weight signal, and wherein the selected loader controller receives the load weight signal on the channel available for communications, and displays the received load weight on the weight display means.

A remaining weight display means can be attached to each loader controller, and the loader controller preferably calculates the difference between a rated load weight value, stored in advance in each dump truck controller, and the actual load weight value, and can display the calculated difference on the remaining weight display means.

The system can further comprise a start permission input switch attached to each loader controller, and a start permission reporting means attached to each dump truck controller; the loader controller, when inputting a dump truck start permission signal from the start permission input switch, can transmit the start permission signal to the dump truck controller on the channel available for communications; and the dump truck controller, which has received the start permission signal, can report a start permission signal to an operator by the start permission reporting means.

A radio communication prohibition switch can be attached to each dump truck controller, and the dump truck controller can prohibit the transmission of an open request to the loader controller when a radio communication prohibition signal, inputted from the radio communication prohibition switch, is set for communication prohibition, and can transmit the load weight on the channel available for communications when the radio communication prohibition signal is not set for communication prohibition.

A standby input switch can be attached to each loader controller, and the loader controller can open a radio communication link with the dump truck controller to receive the load weight signal on the channel available for communications when a standby signal, inputted from the standby input switch, is set at standby, and cannot accept the request for opening the radio communication link from the dump truck controller when the standby signal is not set at standby.

A communication anomaly reporting means can be attached to at least one of each loader controller and each dump truck controller, so that when an error of the received data or a communication anomaly such that a no-response condition occurs a predetermined number of times or more is judged, each loader controller or each dump truck controller, to which the communication anomaly reporting means is attached, can report the communication anomaly to an operator by the communication anomaly reporting means.

A remaining weight display means and a communication link disconnect requesting means can be attached to each dump truck controller, and the dump truck controller can calculate the difference between a rated load weight value, stored in advance, and the actual load weight value, display the calculated difference on the remaining weight display means, and forcibly disconnect a radio link with each loader controller when inputting a communication link disconnect request signal from the communication link disconnect requesting means.

The communication link disconnect requesting means can be comprised of a travel distance detector for detecting a travel distance of the dump truck, and a communication link disconnect judging means for inputting the detected travel distance; and the communication link disconnect judging means can output the communication link disconnect request signal to the dump truck controller when the detected travel distance becomes equal to or exceeds a predetermined value.

According to the described construction of the first aspect, in the case where a plurality of dump trucks and loaders simultaneously operate in cooperation, one of a plurality of channels is exclusively used as a channel for radio communication between a specific dump truck and the corresponding loader. Thus, the signal for the load weight of the dump truck can be transmitted to the loader without interference, and the load weight can be reliably monitored from the loader. In addition, by displaying on the loader the remaining weight value, the loader operator can easily decide how much more should be loaded. Thus, the operator does not have to make a troublesome calculation, thus offering high operability.

In addition, when the loader operator judges a load completion, and operates the start permission input switch, the start permission signal is directly transmitted to the dump truck by radio communication. On the dump truck, the start permission can be reported to the operator when a start permission signal is received. This allows a sign of a load completion to be sent to the operator on the dump truck without being influenced by field noise.

Further, by attaching the radio communication prohibition switch or the standby input switch, a vehicle removed from the system can be brought into a condition where radio communication cannot be accomplished. That is, when a vehicle among the dump trucks and loaders in use is removed from the system, e.g., for maintenance, the standby input switch on the loader is set to "standby-off condition" and the radio communication prohibition switch on the dump truck is set to "radio communication prohibited condition". This can prevent radio interference without performing a useless communication link opening with the other dump trucks and loaders which are being used in the system. In addition, by attaching the communication anomaly reporting means, an occurrence of the radio communication anomaly can be reported to the operator by the communication anomaly reporting means. This can prevent the communication link from taking a long period of time to be opened, and prevent a display of the load weight from lagging behind the true timing. Therefore, the operator can immediately cope with the communication anomaly, thus improving operability.

Still further, by attaching the remaining weight display means and the communication link disconnect requesting means to each dump truck controller, when the dump truck operator watches the display of the remaining load weight and decides that the loading can be completed, the operator can move the dump truck to the earth dumping field without waiting for a start permission signal for the dump truck from the loader operator. This can flexibly cope with free movement of the dump truck, such as a cross loading operation, during the loading operation. And, when the dump truck is moved by the decision of the operator, interference of the radio link can be better prevented when the used radio link is disconnected. In addition, in the case where the communication link disconnect requesting means is comprised of the travel distance detector and the communication link disconnect requesting means, when the travel distance data of the dump truck becomes equal to or exceeds a predetermined value, it can be judged that the dump truck is moving toward the earth dumping field such that the radio link can be disconnected. This can disconnect a useless communication link, and prevent radio interference.

In a second aspect of a load weight monitoring system for monitoring loading operations of a dump truck and a loader, there is provided a load weight monitoring system for the dump truck including: a dump truck controller, provided on the dump truck; a loader controller, provided on the loader and available for communicating by radio with the dump truck controller; a weight detector, provided on the dump truck to detect the load weight of the dump truck; and a weight display means, provided on the loader to display the detected load weight through the dump truck controller and the loader controller; the system comprising:

a start permission input switch, provided on the loader, and a communication link disconnect requesting means provided on the dump truck, wherein the loader controller, when inputting a dump truck start permission signal from the start permission input switch, transmits the start permission signal to the dump truck controller, and the dump truck controller forcibly disconnects a radio link with the loader controller when receiving the start permission signal from the loader controller, or when inputting a communication link disconnect request signal from the communication link disconnect requesting means.

The communication link disconnect requesting means can be comprised of a travel distance detector for detecting the travel distance of the dump truck, and a communication link disconnect judging means for inputting the detected travel distance, and the communication link disconnect judging means can output the communication link disconnect request signal to the dump truck controller when the detected travel distance becomes equal to or exceeds a predetermined value.

According to the described construction of the second aspect, even in the case of one loader, the same actions as those of the first aspect of a plurality of loaders can be obtained. Particularly, the function of the communication link disconnect requesting means to forcibly disconnect the communication link from the dump truck is effective even in the case of one loader, and this can cope with a flexible loading operation.

BRIEF DESCRIPTION OF DRAWINGS

FIGS. 5A, 5B, and 5C are drawings each showing the first half of a communication control procedure of the load weight monitoring system of the first embodiment, in which FIG. 5A is a flowchart in a CPU 20;

FIG. 5B is an illustration showing transmitting/receiving data or a communication control command between FIG. 5A and FIG. 5C; and FIG. 5C is a flowchart in a CPU 50;

FIG. 6A is a flowchart of the procedure following FIG. 5A;

FIG. 6B is an illustration showing transmitting/receiving data or a communication control command between FIG. 6A and FIG. 6C;

FIG. 6C is a flowchart of the procedure following FIG. 5C;

FIG. 7A is a flowchart of the procedure following FIG. 6A;

FIG. 7B is an illustration showing transmitting/receiving data or a communication control command between FIG. 7A and FIG. 7C;

FIG. 7C is a flowchart of the procedure following FIG. 6C;

FIGS. 10A, 10B, and 10C are drawings each showing a communication control procedure of the load weight monitoring system of the second embodiment, in which FIG. 10A is a flowchart of the procedure of the CPU 20 which is performed following FIG. 6A;

FIG. 10B is an illustration showing transmitting/receiving data or a communication control command between FIG. 10A and FIG. 10C;

FIG. 10C is a flowchart of the procedure of the CPU 50 which is performed following FIG. 6C;

BEST MODE FOR CARRYING OUT THE INVENTION

The preferred embodiments of a load weight monitoring system for a dump truck according to the present invention will now be described in detail with reference to the attached drawings.

Figure 1:
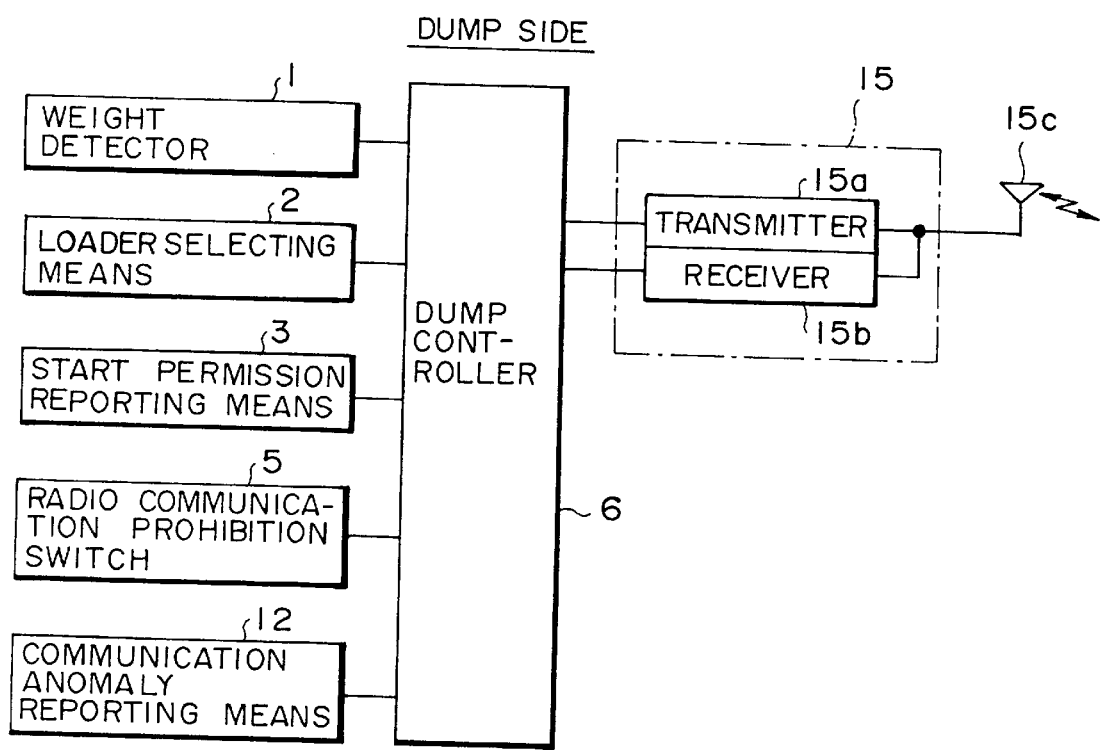
FIG. 1 is a functional block diagram of a dump truck side showing a basic construction of a first embodiment of the present invention.
Figure 2:
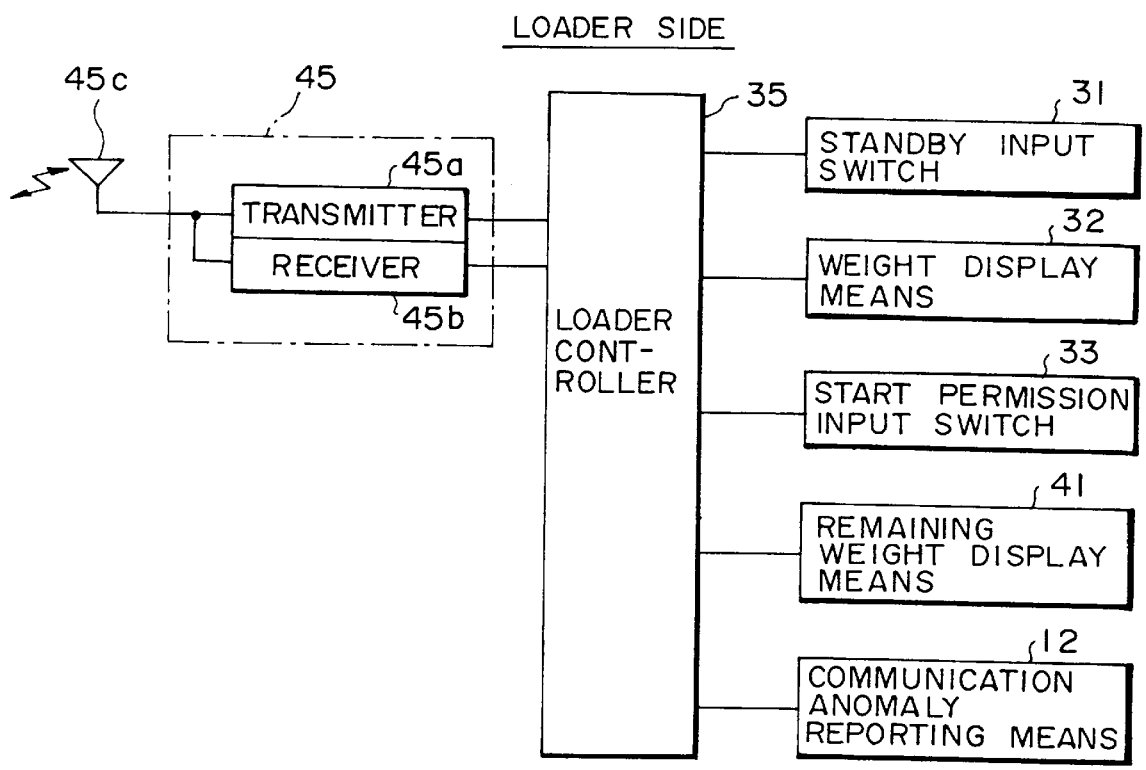
FIG. 2 is a functional block diagram of a loader side showing a basic construction of the first embodiment.

FIGS. 1 and 2 are functional block diagrams each showing a basic construction of a dump truck side and a loader side of a first embodiment. First, with regard to the dump truck side, a controller 6 on the dump truck (hereinafter, referred to as a dump truck controller 6) inputs a load weight signal from a weight detector 1, a loader selection signal from a loader selecting means 2, and a radio communication prohibition signal from a radio communication prohibition switch 5. In addition, the dump truck controller 6 outputs a start permission signal to a start permission reporting means 3, and a communication anomaly signal to a communication anomaly reporting means 12. The dump truck controller 6 outputs the above-described inputted load weight signal and a communication control signal to a transmitter 15a, and inputs the start permission signal, etc., from a receiver 15b. The transmitter 15a and the receiver 15b radio the load weight signal and the communication control signal through an antenna 15c to a transmitter-receiver 45 on the loader.

Next, on the loader side, a controller 35 on the loader (hereinafter, referred to as a loader controller 35) communicates by radio with the transmitter-receiver 15 on the dump truck side through an antenna 45c and the transmitter-receiver 45. The loader controller 35 inputs a standby signal from a standby input switch 31, and a start permission signal from a start permission input switch 33. In addition, the loader controller 35 outputs the load weight signal, inputted through the receiver 45b, to a weight display means 32, and outputs to a remaining weight display means 41 the weight remaining until the rated weight is reached. The loader controller 35 outputs a communication anomaly signal to the communication anomaly reporting means 12.

Figure 3:
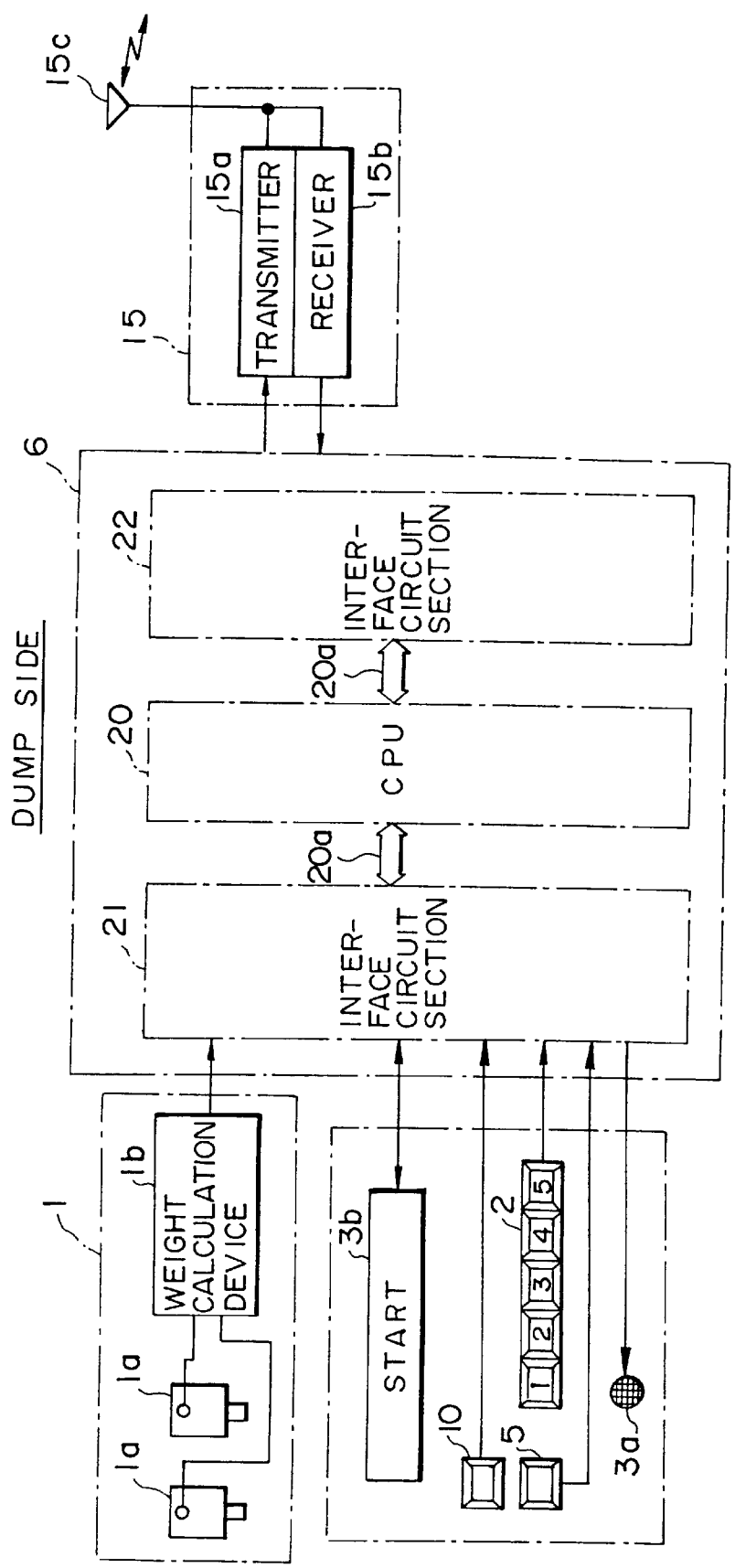
FIG. 3 is a hardware block diagram of the dump truck side of the first embodiment.
Figure 4:
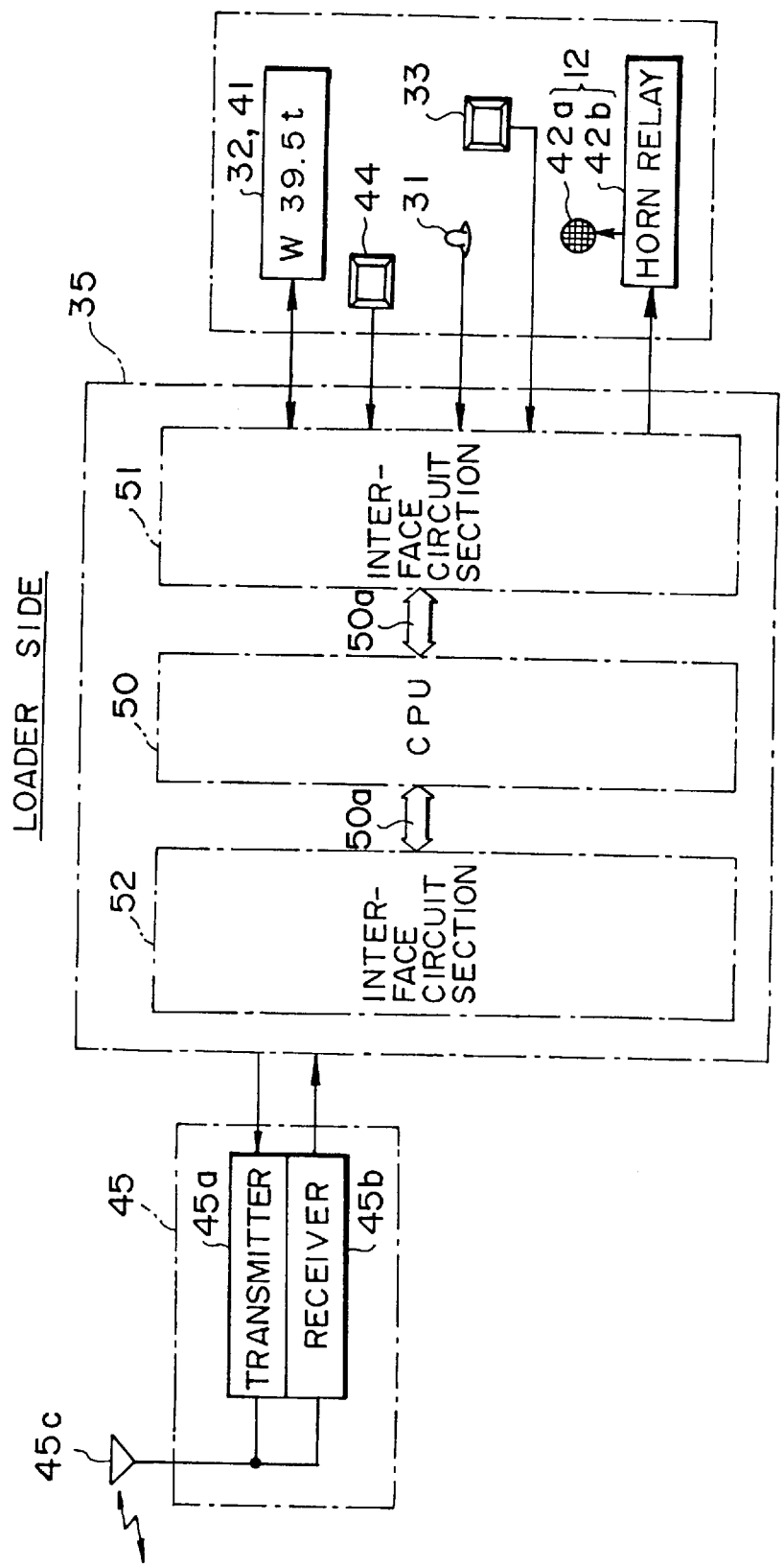
FIG. 4 is a hardware block diagram of the loader side of the first embodiment.

Specific hardware block diagrams of the first embodiment are shown in FIGS. 3 and 4 in relation to FIGS. 1 and 2. The construction will be described in detail with reference to FIGS. 3 and 4.

First, the dump truck side will be described. The weight detector 1 detects the load weight, and is comprised of pressure sensors 1a and a weight calculation device 1b. The pressure sensors 1a detect the pressure in the extension chamber of a front wheel suspension cylinder, mounted between the body of the dump truck and the steering front wheels, and in the extension chamber of a rear wheel suspension cylinder, mounted between the body and the driving rear wheels, and output the pressure signals to the weight calculation device 1b. The weight calculation device 1b inputs the pressure signals at the time of loading earth, sand, etc., and calculates the load weight at that time, based on the difference from a previously inputted pressure signal at the time of no load. The load weight signal is outputted to an interface circuit section 21.

Incidentally, the calculating function of the weight calculation device 1b can be shared by the calculating function of a computer (hereinafter, a CPU 20) which constitutes the dump truck controller 6, and the weight calculation device 1b can be included in the CPU 20.

The loader selecting means 2 selects an ID number of a loader, from a plurality of loaders, for loading the dump truck. In this embodiment, it is comprised of an alternative push-button switch. When a certain switch is pushed, other pushed buttons are mechanically reset and the newly pushed condition is mechanically held to output a loader selection signal corresponding to the newly pushed switch. For example, when as many as five loaders are useable in a system, a quintuple alternative push-button switch shown in FIG. 3 can be employed. Alternatively, the loader selecting means 2 can be a rotary selector switch, or a key switch type such that the ID number of the selected loader can be directly numerically inputted. The loader selection signal, outputted by the loader selecting means 2, is outputted to the interface circuit section 21.

The start permission reporting means 3 indicates a start permission signal to the operator by sound, voice, and/or display, and can be comprised of a buzzer 3a and a character display 3b. The buzzer 3a is provided in the driver's cab so that the influence of noise is decreased and the sound is audible to the operator. Alternatively, the means can be comprised of a horn and a voice generator. The character display 3b inputs a character display command from the CPU 20 through the interface circuit section 21 to display characters. For example, at the time of a start permission signal, the characters "START" as shown in FIG. 3 are displayed. In the case of the character display, since large amounts of data are usually inputted and/or outputted, the interface circuit section 21 is comprised of a parallel or serial communication interface. In this embodiment, it is comprised of an 8-bit serial communication interface. In addition, as another example of display, switching of light-up/light-out of a danger reporting light, a lamp, and an LED display can be employed.

The radio communication prohibition switch 5 prohibits an output of an open request for a communication link from the dump truck side to the loader side, and is comprised of a push-button switch. That is, the arrangement is such that the switch is mechanically associated with the above loader selection switch, and all the loader selection switches are switched off when the radio communication prohibition switch 5 is pushed. Therefore, no loader selection signal is outputted at all thereafter, and the dump truck controller 6 does not output the open request for a radio communication link to the loader side. Incidentally, the radio communication prohibition switch 5 can be comprised of a normal switch which is not mechanically associated with the loader selection switch, and the dump truck controller 6 can input a condition of the radio communication prohibition switch to control the open request for the radio communication link.

The communication anomaly reporting means 12 reports the occurrence of a communication anomaly to the dump truck operator by means of sound, voice and/or a display. The communication anomaly reporting means 12 can be comprised of a buzzer, a horn, and/or a voice generator similar to the start permission reporting means 3, or can be comprised of a character display, a danger reporting light, a lamp, and an LED display.

In this embodiment, the communication anomaly reporting means 12 doubles as the start permission reporting means 3. When the communication anomaly occurs, the method of producing the sound differs from that used at the time of the start permission signal. For example, the anomaly is reported by changing the interruption time of the sound. In addition, an error code and a message representing the occurrence of the communication anomaly are displayed on the character display, and a display selection switch 10 for switching the contents of the display is included. The CPU 20 inputs a switching signal from the display selection switch 10 through the interface circuit section 21, and switches the contents of the display to the start permission display or the communication anomaly display each time the switching signal is set ON.

The dump truck controller 6 is comprised of a so-called microcomputer system, and includes the CPU 20, the interface circuit sections 21 and 22, and a bus 20a for inputting and outputting data and a CPU control signal to and from the outside, such as an external switch, a display, and a transmitter-receiver. In addition to a common storage section, a processing section, an execution control section, and an interrupt service section, the CPU 20 includes a ROM, in which a system program for determining an execution procedure of the system is stored, and a RAM, for temporarily storing data, etc., during calculation and execution.

Since the CPU 20 inputs and outputs signals and data to and from the peripheral switch, the display, and the transmitter-receiver, etc., the interface circuit sections 21 and 22 adjust circuit connecting specifications so that the CPU 20 can read and write the above signals and data through the bus 20a. In this embodiment, although these are collectively called interface circuit sections, the interface section with the weight calculation device 1b and the character display 3b is comprised of an input/output circuit of a so-called 8-bit serial communication, and the interface circuit section with the transmitter-receiver 15 and each switch is comprised of a parallel input/output circuit.

The transmitter 15a inputs the load weight signal and the radio communication control command from the CPU 20 through the interface circuit section 22, and transmits them by radio to the loader side through the antenna 15c. In addition, the receiver 15b receives the start permission signal and the radio communication control command by radio from the loader side through the antenna 15c, and outputs them to the CPU 20 through the interface circuit section 22. Incidentally, a frequency for use in the radio communication is designated by the CPU 20.

Next, the loader side will be described. The loader controller 35 is comprised of a microcomputer similar to the dump truck controller 6, and includes a CPU 50, a bus 50a, and the interface circuit sections 51 and 52. The construction of the CPU 50 and the construction and functions of the bus 50a and the interface circuit sections 51 and 52 are the same as those of the dump truck controller 6.

The receiver 45b of the transmitter-receiver 45 receives by radio through an antenna 45c the weight data and the radio communication control command transmitted from the transmitter 15a on the dump truck side, and outputs them to the CPU 50 through the interface circuit section 52 and the bus 50a. In addition, the transmitter 45a inputs the start permission signal and the radio communication control command from the CPU 50 through the bus 50a and the interface circuit section 52, and transmits them by radio through the antenna 45c to the dump truck side. Incidentally, a frequency for use in the radio communication is designated by the CPU 50.

The standby input switch 31 selects whether or not the open request for a radio communication link from the dump truck side is accepted,sand is comprised of an alternate selection switch. When the standby input switch 31 is selected in a standby condition, a standby signal is inputted to the CPU 50 through the interface circuit section 51 and the bus 50a.

The start permission input switch 33 is the switch operated by the loader operator when a start of the dump truck now loading is permitted, and is comprised of a push-button switch of a momentary type. When the start permission input switch 33 is pushed, a start permission signal is inputted to the CPU 50 through the interface circuit section 51. The start permission signal is outputted to the transmitter 45a through the interface circuit section 52. At the same time, the CPU 50 outputs a horn driving signal to a horn driving relay 42b through the interface circuit section 51, whereby the horn driving relay 42b is actuated to sound a horn 42a.

The weight display means 32 and the remaining weight display means 41 display a current load weight value and a value of weight remaining until the rated load weight value is reached, respectively. In this embodiment, a character display is employed similar to the start permission reporting means 3. In addition, since the weight display means 32 doubles as the remaining weight display means 41, a display selection switch 44 for switching the contents of the display is included. The display selection switch 44 is comprised of a switch of a momentary type. The CPU 50 inputs a switching signal from the display selection switch 44 through the interface circuit section 51, and outputs the load weight signal or the remaining weight signal through the interface circuit section 51 to the weight display means 32 each time the switching signal is set ON. Incidentally, the weight display means 32 and the remaining weight display means 41 can be a numerical value display such as a 7-segment LED.

The communication anomaly reporting means 12 on the loader side is the same as that on the above-described dump truck side and comprises the horn 42a, the horn driving relay 42b, and the weight display means 32. The CPU 50 reports the communication anomaly by changing the interruption time of the horn driving signal from that used at the time of a start permission signal, as described above. In addition, the CPU 50 outputs weight display data, remaining weight display data, and an error message to the weight display means 32 each time the switching signal from the display selection switch 44 is set ON in the same manner as described above.

Next, an operation of the load weight monitoring system of this embodiment according to the above construction will be described. This embodiment is the example which enables a radio communication between each dump truck and each loader without interference in a system in which a plurality of dump trucks and a plurality of loaders simultaneously operate in cooperation. Thus, in order to use a plurality of radio communication frequencies, and at the same time, to use the plurality of radio frequencies effectively so as to flexibly cope with increases and decreases in the number of the working vehicles used in the system, a so-called multichannel access method is employed. That is, a plurality of data channels which can cope with the maximum number of the loaders expected to be used in the system are prepared, a free data channel which is not currently used for communication is searched (a so-called carrier sense) from a plurality of data channels, and the data and the communication control command are exchanged using the free data channel.

Now, assume that a maximum of ten loaders are expected to be used in a system, and only five loaders thereof are actually used. At this time, the maximum ten data channels which could be used in this system are prepared. In addition to the data channels, control channels for exchanging control information before starting communication with the data channel are prepared. The number of the control channels can be one, but a plurality of channels is preferably prepared in order to reduce a waiting time at the time of opening the communication link. For the purpose of simplifying explanation, the number of the control channels is herein assumed to be one.

The CPU 20 of the dump truck controller 6, and the CPU 50 of the loader controller 35 form a main part of a radio communication control function for the load weight monitoring system of this embodiment. Processing of the CPU 20 and the CPU 50 will now be described with reference to FIGS. 5A to 5C, FIGS. 6A to 6C, and FIGS. 7A to 7C. Incidentally, the contents of processing executed by the CPU 20 and the CPU 50 are mainly described below, and descriptions of the CPU 20 and the CPU 50 are suitably omitted.

(Step 101) The CPU 20 inputs the loader selection signal from the loader selecting switch 2 through the interface circuit section 21.

(Step 102) It is judged whether or not the above loader selection signal is ON. If ON, a procedure advances to step 103. If OFF, the procedure returns to step 101 to repeat the above until the signal is judged to be ON.

(Step 103) Next, free channels which are not currently used for communication are sequentially searched among a plurality of data channels (10 channels in this embodiment) prepared in advance. More specifically, whether or not the data or a control signal is communicated is checked for a predetermined period of time through the receiver 15b with the use of a data channel to be initially searched. If communicated, the data channel is judged to be in use. In this embodiment, since the load weight signal is transmitted from the dump truck side to the loader side for each predetermined period of time during the use of the data channel, the presence or absence of the communication is checked at least for the predetermined period of time. When the data channel is judged to be in use, the next data channel is similarly checked. When a free channel is judged, the procedure advances to step 104.

(Step 104) The ID number of the loader corresponding to the loader selection signal, inputted from the loader selecting switch, is read out of a memory in the CPU 20. When the ID number is fixedly stored, the memory can be a ROM, while the memory can be a RAM when storing the ID number so as to be variable. When the control channel is not in use, the ID number of the above-described loader, and the above-described searched free channel information (channel frequency information) are transmitted with the use of the control signal through the transmitter 15a. Thereafter, the procedure advances to step 105.

Incidentally, when there are a plurality of control channels, a control channel which is not in use in a plurality of channels is searched, and the above loader ID number and the free data channel information are transmitted with the use of the free control channel. In addition, a method of searching for a free control channel can be the same as the above-described method of searching for a free data channel.

In step 104, when the radio communication prohibition switch 5 is pushed, and all the switches of the loader selecting switch 2 are not pushed, all of the loader selection signals, inputted from the loader selecting switch 2, are set to OFF. At this time, the frequency information, of the above free data channel, and the loader ID number are not transmitted.

On the other hand, the CPU 50 performs the following processing during the period of time.

(Step 201) The CPU 50 inputs a standby signal from the standby input switch 31 through the interface circuit section 51.

(Step 202) It is judged whether or not the above standby signal is ON. If ON, the procedure advances to step 203. If OFF, the procedure returns to step 201 to repeat the above process until the signal is judged to be ON.

(Step 203) The ID number of the loader and the free data channel information transmitted from the CPU 20 are received through the receiver 45b with the use of the control channel.

(Step 204) It is judged whether or not the inputted loader ID number is coincident with a private ID number. If they are coincident with each other, the procedure advances to step 205. If they are not coincident, the procedure returns to step 203 to repeat the above until the are coincident with each other.

(Step 205) The free data channel information inputted in step 203 is stored in the RAM. In addition, a "receive OK" signal is transmitted through the transmitter 45a with the use of the same control channel as that described above. Thereafter, communication is performed on the data channel.

In the CPU 20, the procedure advances to the following steps after step 104.

(Step 105) The CPU 20 inputs data received through the receiver 15b with the use of the same control channel as the control channel which has transmitted the free data channel information in step 104.

(Step 106) It is judged whether or not the received data are the "receive OK" signal transmitted by the CPU 50. If "receive OK", the procedure advances to step 107. If not, the procedure returns to step 105 to repeat the above processing until the data becomes "receive OK".

Thereafter, communication is performed on the data channel.

(Step 107) It is judged whether or not the loader starts loading based on the scale of the load weight signal inputted from the weight calculation device 1b. For example, the current value of the load weight is compared with the load weight before the start of loading, and when the difference therebetween becomes equal to or exceeds a predetermined value, a load starting is judged. As the load weight before a load starting, the load weight after earth removal, and the load weight at the time of the latest stopping can be considered. When a load starting is judged, the procedure advances to step 108. If not, the procedure waits until a load starting is judged.

(Step 108) The frequency information of the above free data channel is outputted to the transmitter 15a and the receiver 15b so that the communication frequency of the transmitter 15a and the receiver 15b is fixed to the communication frequency of the free data channel searched in step 103.

(Step 206) The CPU 50 also outputs the frequency information of the free data channel to the transmitter 45a and the receiver 45b so that the communication frequency of the transmitter 45a and the receiver 45b is fixed to the communication frequency corresponding to the free data channel stored in step 205.

(Step 109) The private ID number, stored in the memory in advance, and the rated load weight value data are read out. Incidentally, the private ID number can be set by, for example, an ID number setting switch mounted on a substrate provided in the dump truck controller 6. In this case, the CPU 20 can input the set data of the above ID number setting switch through the interface circuit, and can read the rated load weight data corresponding to the ID number from a predetermined address in the memory.

(Step 110) The ID number of the corresponding loader, the private ID number, and the rated load weight data are transmitted on the above free data channel through the transmitter 15a.

(Step 207) The CPU 50 inputs the ID number of the loader, the private ID number on the dump truck side, and the rated load weight signal from the free data channel through the receiver 45b. After checking that the inputted ID number of the loader is coincident with the private ID number, the data are stored in predetermined addresses of the RAM.

(Step 208) The CPU 50 transmits the "receive OK" signal through the transmitter 45a.

(Step 111) The CPU 20 inputs the data received through the receiver 15b, and judges whether or not the data are the "receive OK" signal. If the "receive OK" signal, the procedure advances to step 112. If not, the procedure returns to step 110 to repeat the processing.

(Step 112) The CPU 20 transmits an "ACK signal" through the transmitter 15a. The "ACK" signal is the verification signal for verifying to each other whether or not the communication is being normally done, and is the code meaning "acknowledge". In this condition, the communication link is opened, and thereafter the procedure advances to step 113.

(Step 209) The CPU 50 inputs the data received through the receiver 45b, and judges whether or not the data are the "ACK signal". If the "ACK" signal, the procedure advances to step 210. If not, the procedure returns to step 209 to repeat the processing, and to wait until the "ACK" signal is inputted.

(Step 210) In this condition, the communication link is opened. The CPU 50 transmits a "load weight data request" signal through the transmitter 45a. Thereafter, the procedure advances to step 211.

(Step 113) The CPU 20 inputs the received data, and judges whether or not the data are a "load weight data request" signal. If the "load weight data request" signal, the procedure advances to step 114. If not, the procedure returns to step 113 to repeat the processing, and to wait until the "load weight data request" signal is inputted.

(Step 114) The CPU 20 inputs a current load weight value from the weight calculation device 1b through the interface circuit section 21.

(Step 115) The inputted current load weight value is transmitted through the transmitter 15a. Thereafter, the procedure advances to step 116.

(Step 211) The CPU 50 inputs the current load weight value through the receiver 45b.

(Step 212) A remaining weight value is calculated from the inputted current load weight value and the rated load weight value, stored in the above-described RAM memory, based on the expression "remaining weight value=rated load weight value−current load weight value". The remaining weight value and the current load weight value are outputted to the weight display means 32 to be displayed thereon. In this embodiment, as described above, the condition of the display selection switch 44 is inputted, and the contents of the display are switched each time the switch is ON, thereby outputting the remaining load weight value or the current load weight value.

(Step 213) The condition of the start permission input switch 33 is inputted to judge whether or not the start permission signal is ON. If the start permission signal is ON, the procedure advances to step 214. If not, the procedure returns to step 211 to repeat the above processing.

(Step 214) A "start permission command" is transmitted through the transmitter 45a. Thereafter, the procedure advances to step 215.

(Step 116) The CPU 20 judges whether or not the data inputted through the receiver 15b are the "start permission command". If the "start permission command", the procedure advances to step 118. If not, the procedure advances to step 117.

(Step 117) It is judged whether or not a predetermined period of time has elapsed since the load weight signal was outputted in step 115. If the predetermined period of time has elapsed, the procedure returns to step 113, whereby the transmittance of the latest load weight signal is repeated for each predetermined period of time. In addition, if the predetermined period of time has not elapsed, the procedure returns to step 116, whereby the procedure waits for the inputting of the "start permission command".

(Step 118) The "ACK" signal is transmitted through the transmitter 15a. Thereafter, the procedure advances to step 119.

(Step 215) The CPU 50 judges whether or not the data inputted through the receiver 45b are the "ACK" signal. If the "ACK" signal, the procedure advances to step 216. If not, the procedure returns to step 215 to wait for the "ACK" signal.

(Step 216) In this step, a communication link disconnection processing is performed. That is, a reset command of the previously used data channel information is outputted to the transmitter 45a and the receiver 45b, whereby the used data channel is opened for communications between other vehicles.

(Step 217) The start permission horn 42a is actuated, through the start permission horn driving relay 42b, to sound a start permission signal. In addition, a start permission message, etc., are displayed on the weight display means 32.

(Step 218) After performing the communication link disconnect processing in step 216, a lapse of a predetermined period of time is awaited. After the lapse of the predetermined period of time, the procedure returns to step 210 of the initial processing to wait for the link open request from the dump truck side.

(Step 119) The CPU 20 performs a communication link disconnection processing on the dump truck side in the same manner as that on the loader side. That is, a reset command of the previously used data channel information is outputted to the transmitter 15a and the receiver 15b, whereby the used data channel is opened for communications between other vehicles.

(Step 120) An actuation signal is outputted to the start permission buzzer to sound the start permission signal, and the start permission message, etc., are displayed on the display of the start permission reporting means 3. Thereafter, the procedure returns to the step 101 of the initial processing.

The above is the communication control procedure of the first embodiment. Incidentally, although it is not illustrated, the presence or absence of a communication anomaly is checked when receiving data and the control signal. In this embodiment, a communication anomaly is detected by the following two methods. The first one is a parity check of the data which is commonly performed. When an error is detected in checking a parity of the received data and the control signal, a "NACK" (No ACK) signal is transmitted to the opposite side to output a re-sending request. When the same error is continuously detected a predetermined number of times or more, it is judged as a communication anomaly.

The second one is a checking of the presence or absence of a response whether or not each transmitted data and control signal are received by the opposite side. When there is no response to the transmittance of the data and the control signal from the opposite side after the lapse of a predetermined period of time, for example, when the "ACK" signal and the "NACK" signal do not return, the data and the control signal are transmitted again. When such a non-response condition continuously occurs a predetermined number of times or more, it is also judged as a communication anomaly. At the time of a communication anomaly, the CPUs 20 and 50 can report it to the operator by means of each communication anomaly reporting means 12, whereby the reliability of communication can be improved, and the operator can easily learn of the occurrence of the communication anomaly.

As described in this embodiment, since a plurality of channels are prepared, and different data channels are exclusively used in communication between a respective dump truck controller 6 and a respective loader controller 35, there is no waiting time at the time of communication link opening, and radio interference is eliminated. Incidentally, as a method of using a plurality of data channels, there is a method other than the multichannel access method of this embodiment. For example, the channels to be used in the transmitter-receiver of each loader are fixed to the channels different from each other. Then, the dump truck controller 6 performs communication in accordance with the channel corresponding to the loader selected by the loader selecting means 2. By this communication method, the effect of the present invention does not change.

In addition, since the value, of weight remaining until the rated load weight value is reached, is displayed on the loader side, the loader operator can watch the display and easily decide how much more should be loaded. In this embodiment, although the rated load weight value is transmitted from the dump truck side to the loader side and the remaining weight value is calculated and displayed on the loader side based on the rated load weight value, the remaining weight value can be first calculated on the dump truck side, and then transmitted to the loader side. In this case, the remaining weight value can be transmitted together with the current value of the load weight, and the remaining weight value can be transmitted when a request command for the remaining weight is received from the loader side.

When the operator on the loader side judges the loading to be near the rated load weight value, the operator pushes the start permission input switch, thereby directly transmitting the start permission signal to the dump truck side by radio communication. On the dump truck side, upon receipt of the start permission signal, a sign can be made to the operator by means of a start permission sound and/or a start permission display.

In the case of removing the dump truck or the loader from use in the system, when the removed vehicle is the dump truck, the radio communication prohibition switch is kept in a radio communication prohibition state, while the standby input switch is kept in a standby-off state when the removed vehicle is the loader. By this, a request for opening the communication link is not made from the dump truck side, and the loader side does not accept the request for opening the communication link from the dump truck side. As a consequence, a useless link is not opened, so that radio interference with unused vehicles can be prevented.

When the dump truck controller 6 or the loader controller 35 detects the communication anomaly, the occurrence of the communication anomaly can be reported to the operator by means of each communication anomaly reporting means. Thus, the operator can immediately cope with the anomaly treatment, and a communication response waiting time at the time of the occurrence of the communication anomaly is shortened, thus improving operability.

Next, a second embodiment according to the present invention will be described.

Figure 8:
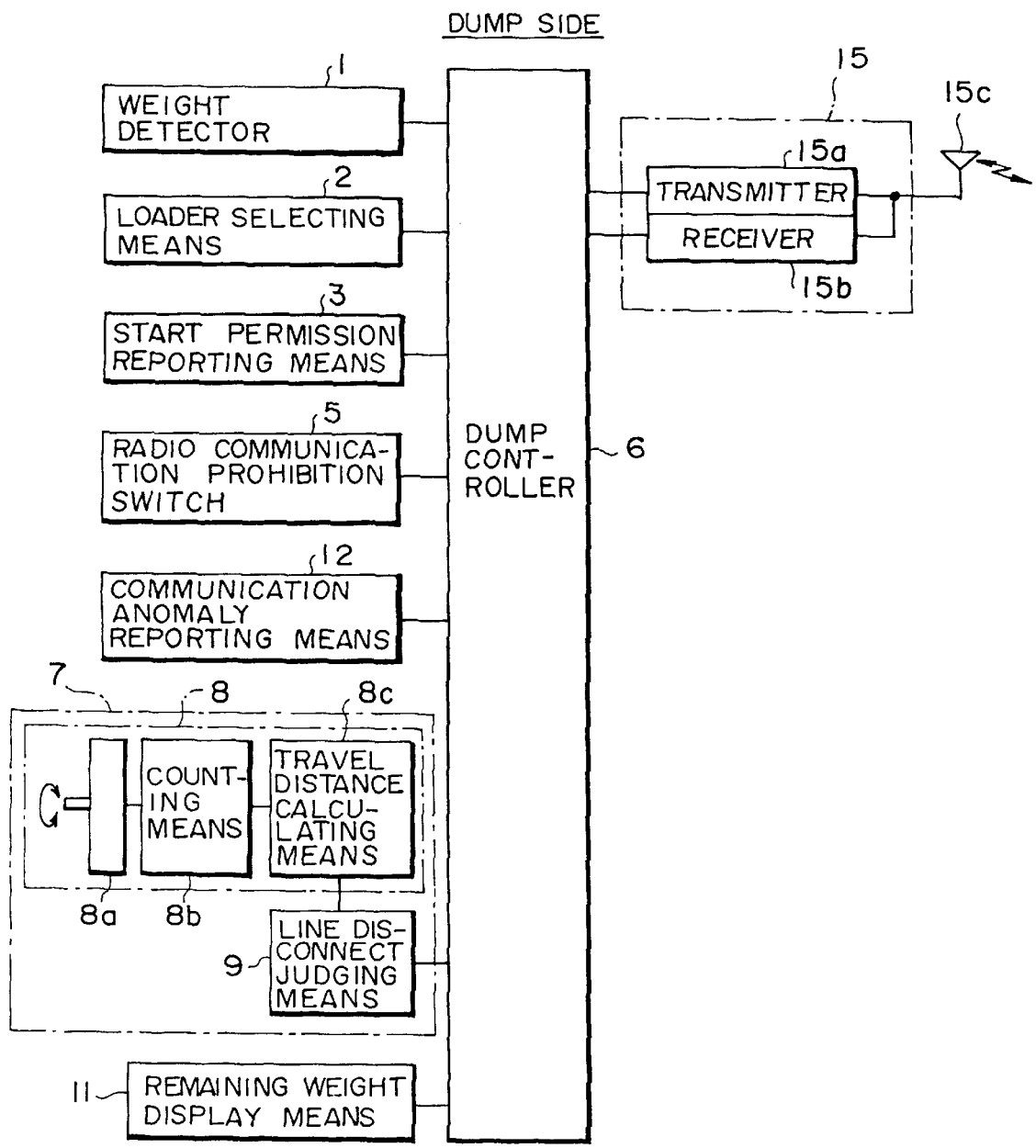
FIG. 8 is a functional block diagram of the dump truck side showing a basic construction of a second embodiment of the present invention.

Referring to FIG. 8, the components are the same as those of the first embodiment except for a communication link disconnect requesting means 7 and a remaining weight display means 11 on the dump truck side. The remaining weight display means 11 displays a value of the weight remaining until the rated load weight value is reached, similar to the remaining weight display means 41 (see FIG. 2) on the loader side, and inputs display data from the dump truck controller 6.

Figure 9:
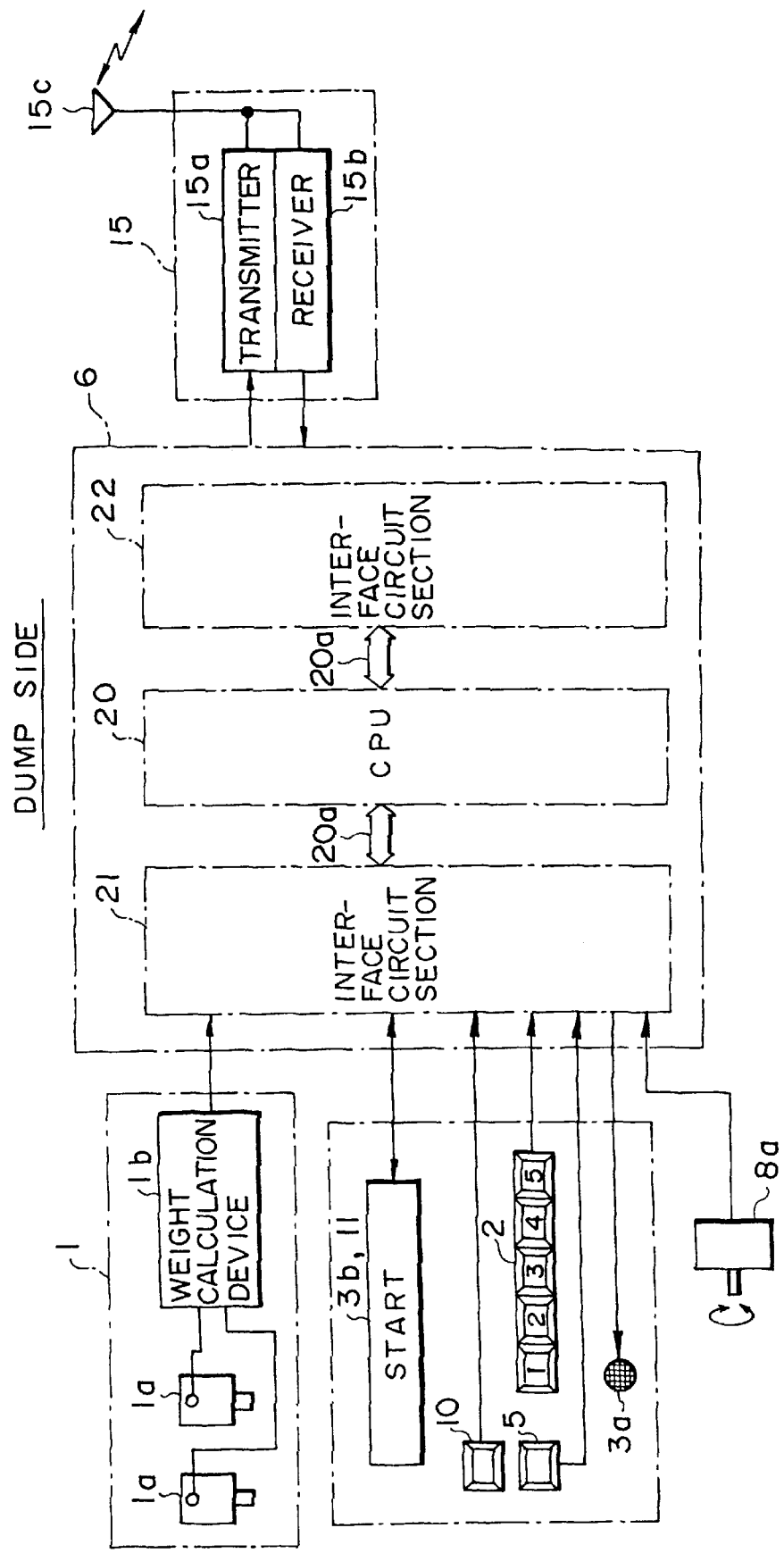
FIG. 9 is a hardware block diagram of the dump truck side of the second embodiment.
Figure 11C:
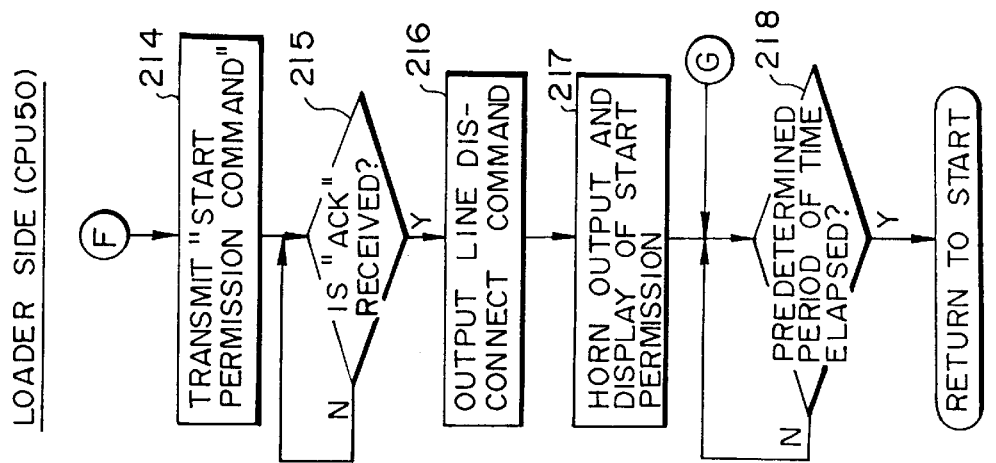
FIG. 11C is a flowchart of the procedure following FIG. 10C.
Figure 11B:
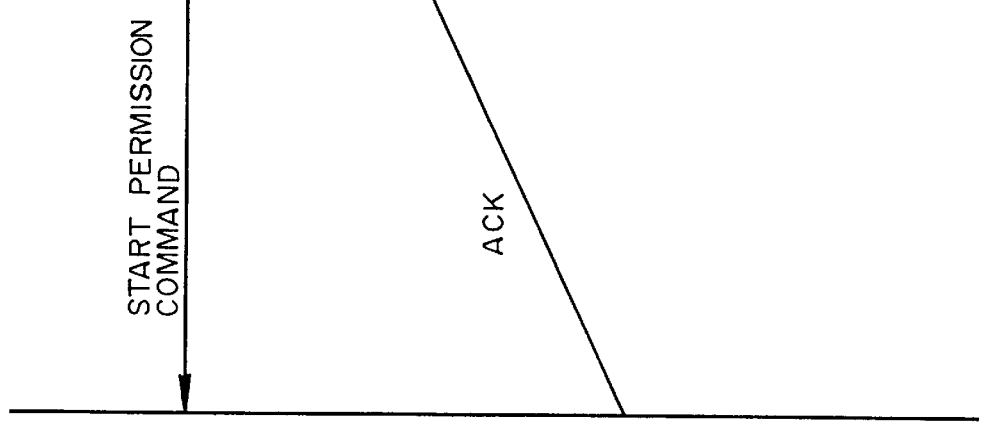
FIG. 11B is an illustration showing transmitting/receiving data or a communication control command between FIG. 11A and FIG. 11C.
Figure 11A:
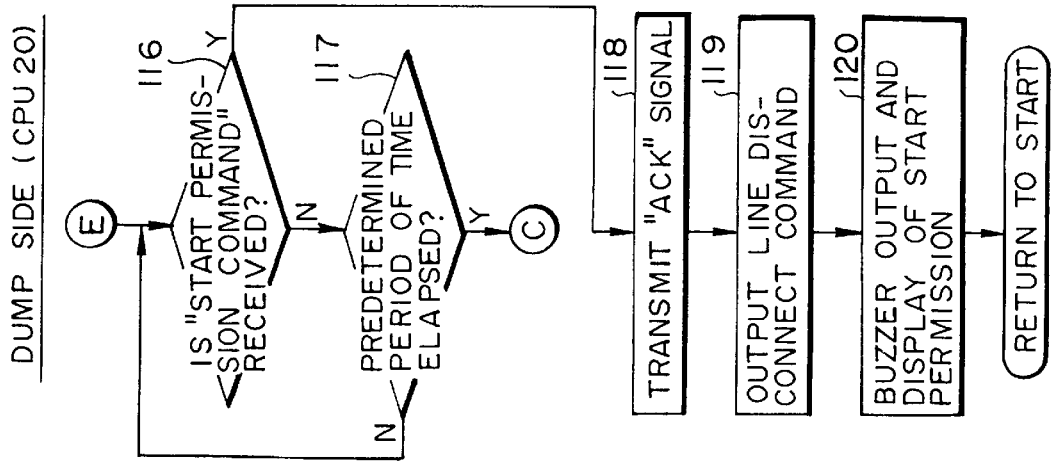
FIG. 11A is a flowchart of the procedure following FIG. 10A.

The communication link disconnect requesting means 7 is comprised of a travel distance detecting means 8 and a communication link disconnect judging means 9. The travel distance detecting means 8 comprises a pulse generator 8*a*, which is fixed to a driving axle shaft of the dump truck for outputting a pulse signal train wherein the number of pulses is proportional to the number of rotations of the driving wheel; a counting means, for inputting the pulse signal train, outputted from the pulse generator 8*a*, to count the number of pulses; and a travel distance calculation means 8*c*, for calculating and outputting travel distance based on the integrated value of the counted value. The communication link disconnect judging means 9 judges whether or not the communication link is disconnected based on the travel distance outputted from the travel distance calculation means 8*c*. When it is judged that the communication link should be disconnected, a communication link disconnection request signal is outputted to the dump truck controller 6. The remaining weight display means 11 also employs the character display in this embodiment, which also doubles as the character display 3*b* of the start permission reporting means 3, as shown in FIG. 9.

In addition, since all of the processing of the counting means 8*b*, the travel distance calculation means 8*c*, and the communication link disconnect judging means 9 can be performed by a microcomputer, these processings are realized with the use of the CPU 20 of the dump truck controller 6. This allows the pulse signal train, outputted from the pulse generator 8*a*, to be directly inputted to the CPU 20 through the interface circuit section 21.

The communication control procedure in this embodiment is a flow such that a few procedures are added to FIGS. 7A to 7C of the first embodiment, and it will be described mainly with reference to FIGS. 10A to 10C and FIGS. 11A to 11C.

(Step 151) After the CPU 20 has inputted the load weight data request command in step 113, the procedure advances to this step to judge whether or not the dump truck is in a stopped condition. If in the stopped condition, the procedure advances to the above-described step 114. If not in the stopped condition, the procedure advances to step 152. The stopped condition is judged when a condition, where no pulse train signal is outputted from the pulse generator 8*a*, continues for a predetermined period of time or longer.

(Step 152) After a load starting has been judged in step 106, the pulse signals, outputted from the pulse generator 8*a*, are counted; and the travel distance is calculated based on the integrated value thereof. Then, it is judged whether or not the travel distance becomes a predetermined value or longer. If the distance becomes the predetermined value or longer, the procedure advances to step 153. If not, the procedure returns to step 151 to repeat the above.

(Step 153) A "link disconnect request command" is transmitted through the transmitter 15*a*. And, the above-described link disconnect processing is performed similarly, whereby the used data channel is opened for communications between other working vehicles.

(Step 251) The CPU 50 judges whether or not the data received through the receiver 45*b* are the "link disconnect request command". If the "link disconnect request command", the procedure advances to step 252. If not, the procedure advances to the above-described step 211.

(Step 252) The above-described link disconnect processing is performed similarly, whereby the used data channel is opened for communications between other working vehicles. Then, the procedure advances to the above-described step 218, and the subsequent flow is the same as that described above.

Incidentally, after the load weight signal has been inputted in step 114 and step 115, and the load weight signal has been transmitted by radio as the current load weight value, the procedure advances to step 161.

(Step 161) The rated load weight value, stored in a predetermined address in the RAM memory, is read; and a remaining weight value is calculated from the rated load weight value and the above current load weight value based on the expression "remaining weight value=rated load weight value−current load weight value". The remaining load weight value is outputted to the remaining weight display means 11 to be displayed thereon. Thereafter, the procedure advances to the above-described step 116.

As described above, the remaining load weight value is calculated and displayed on the remaining load weight display means in step 161, so that the operator on the dump truck side can easily check the remaining weight without calculation. When the operator watches the display and decides a load completion, the dump truck can be started. In addition, when the travel distance becomes a predetermined value or longer in step 151 and step 152, it is judged that the dump truck is going toward a earth dumping field, so the communication link is disconnected and opened for other vehicles.

Further, besides the judgment by the travel distance, the dump truck operator can perform a switch operation to request the communication link disconnection. In this case, the link disconnect request switch is provided, and a link disconnect request signal from the switch is inputted to the dump truck controller 6, The CPU 20 judges whether or not the link disconnect request signal is ON in the step corresponding to step 152. If ON, the procedure can advance to step 153. If not, the procedure returns to step 151 to repeat step 151 and step 152.

Still further, although an example is described in which the remaining weight display means 11 and the link disconnect requesting means 7 are provided on the dump truck side, and the communication link is disconnected by the link disconnect requesting means 7 when the dump truck operator watches the remaining weight display means 11 and decides a load completion, it is not limited to the system of a plurality of dump trucks and loaders. That is, it is effective in a system in which a plurality of dump trucks and one loader, or one dump truck and one loader operate in cooperation. This increases judgment factors for the operators on the dump truck side and on the loader side, respectively, so that the system can be flexibly operated.

According to the present invention as described above in detail, the load weight of the dump truck can be reliably monitored from the loader without the interference of radio communication between the specific dump truck and loader even if a plurality of dump trucks and a plurality of loaders operate in cooperation. In addition, the operator on the loader side can, without calculation, easily check the weight remaining until the rated load weight value is reached. When the operator on the loader side judges a load completion, by operating the start permission input switch, the start permission signal is directly transmitted to the dump truck side by radio communication, and a sign can be made to the dump truck operator by a start permission sound and display, whereby operability for the operators is improved.

Further, the dump truck or the loader removed from the system does not open a useless link with the other dump trucks and loaders which are being used in the system, and radio interference is eliminated. In addition, at the time of an occurrence of a radio communication anomaly, the operator can immediately cope with the communication anomaly treatment. And, it becomes possible to cope with movement of the dump truck during the loading operation, such as a cross loading operation, and to cope with a disconnection of the communication link in moving the dump truck during the loading operation to the earth dumping field due to the judgment of the dump truck operator. These enable a flexible operation of the system.

INDUSTRIAL APPLICABILITY

The present invention is useful as a load weight monitoring system which can reliably transmit, without interference when transmitting by radio, the load weight of each dump truck to a corresponding loader, and improve the operability for operators during a loading operation, and which can flexibly cope with free movement of the dump truck during the loading operation.

We claim:

1. A load weight monitoring system for monitoring loading operations of a plurality of dump trucks and a plurality of loaders, said system comprising:

a plurality of dump truck controllers, each dump truck controller being for association with a respective one of the plurality of dump trucks;

a plurality of loader controllers, each loader controller being for association with a respective one of the plurality of loaders, each loader controller being available for communications by radio with an associated dump truck controller;

a plurality of weight detectors, each weight detector being for association with a respective loader to detect a load weight of an associated dump truck;

a plurality of weight display means, each weight display means being for association with a respective loader to display a detected load weight through an associated dump truck controller and an associated loader controller;

a plurality of loader selecting means, each loader selecting means being for association with a respective dump truck, for selecting from said plurality of loaders a particular loader to be associated with the respective dump truck; and each said dump truck controller and each loader controller being provided with a plurality of channels;

wherein a dump truck controller inputs a loader selection signal from a loader selecting means, selects from a plurality of channels of that dump truck controller a channel available for communications between that dump truck controller and a loader controller corresponding to said loader selection signal, and transmits a load weight signal; and wherein a selected particular loader controller receives said load weight signal on said channel available for communications between the selected particular loader controller and the associated dump truck controller, and displays the received load weight signal on an associated weight display means.

2. A load weight monitoring system in accordance with claim 1, further comprising:

a plurality of dump truck start permission input switches, each dump truck start permission input switch being associated with a respective loader controller;

a plurality of start permission reporting means, each start permission reporting means being associated with a respective dump truck controller;

wherein a loader controller, when inputting a dump truck start permission signal from a dump truck start permission input switch, transmits a dump truck start permission signal to an associated dump truck controller on the channel available for communications between the respective loader controller and the associated dump truck controller; and wherein a dump truck controller, which has received a dump truck start permission signal, reports a start permission to an operator on that dump truck via the respective start permission reporting means.

3. A load weight monitoring system in accordance with claim 1, further comprising:

a plurality of radio communication prohibition switches, each radio communication prohibition switch being associated with a respective dump truck controller; and wherein a dump truck controller prohibits transmission of an open request to an associated loader controller when a radio communication prohibition signal, inputted from an associated radio communication prohibition switch is set for communication prohibition, and transmits a load weight signal on said channel available for communications when said radio communication prohibition signal is not set for communication prohibition.

4. A load weight monitoring system in accordance with claim 1, further comprising:

a plurality of standby input switches, each standby input switch being associated with a respective loader controller; and wherein a loader controller opens a radio communication link with an associated dump truck controller to receive a load weight signal on said channel available for communications when a standby signal, inputted from an associated standby input switch, is set at standby, and does not accept a request for opening said radio communication link from an associated dump truck controller when said standby signal is not set at standby.

5. A load weight monitoring system in accordance with claim 1, further comprising:

a plurality of communication anomaly reporting means, each communication anomaly reporting means being associated with at least one of a loader controller and an associated dump truck controller; and wherein when a communication anomaly occurs, a controller, to which a communication anomaly reporting means is attached, reports said communication anomaly to an operator by an associated communication anomaly reporting means.

6. A load weight monitoring system in accordance with claim 1, further comprising:

a plurality of remaining weight display means and a plurality of link disconnect requesting means, each remaining weight display means and each link disconnect requesting means being associated with a respective dump truck controller; and wherein each dump truck controller calculates a difference between a rated load weight value, stored in advance, and a respective load weight signal, displays the calculated difference on an associated remaining weight display means, and forcibly disconnects a radio link with an associated loader controller when inputting a link disconnect request signal from an associated link disconnect requesting means.

7. A load weight monitoring system in accordance with claim 6, wherein each link disconnect requesting means comprises a travel distance detector for detecting a travel distance of an associated dump truck, and a link disconnect judging means for inputting a detected travel distance and for outputting a link disconnect request signal to an associated dump truck controller when said detected travel distance becomes equal to or exceeds a predetermined value.

8. A load weight monitoring system in accordance with claim 1, further comprising:

a plurality of remaining weight display means, each remaining weight display means being attached to a respective loader controller; and wherein said each loader controller calculates a difference between a rated load weight value, stored in advance in an associated dump truck controller, and said load weight signal, and displays the calculated difference on an associated remaining weight display means.

9. A load weight monitoring system in accordance with claim 8, further comprising:

a plurality of start permission input switches, each start permission input switch being attached to a respective loader controller; and a plurality of start permission reporting means, each start permission reporting means being attached to a respective dump truck controller;

wherein a loader controller, when inputting a dump truck start permission signal from an associated start permission input switch, transmits a start permission signal to an associated dump truck controller on said channel available for communications; and wherein a dump truck controller, which has received a start permission signal, reports a start permission to an operator by an associated start permission reporting means.

10. A load weight monitoring system in accordance with claim 8, further comprising:

a plurality of radio communication prohibition switches, each radio communication prohibition switch being attached to a respective dump truck controller; and wherein a dump truck controller prohibits transmission of an open request to an associated loader controller when a radio communication prohibition signal, inputted from an associated radio communication prohibition switch, is set at communication prohibition, and transmits a load weight signal on said channel available for communications when said radio communication prohibition signal is not set at communication prohibition.

11. A load weight monitoring system in accordance with claim 8, further comprising:

a plurality of standby input switches, each standby input switch being attached to a respective loader controller; and wherein a loader controller opens a radio communication link with an associated dump truck controller to receive said load weight signal on said channel available for communications when a standby signal inputted, from an associated standby input switch, is set at standby, and does not accept a request for opening said radio communication link from an associated dump truck controller when said standby signal is not set at standby.

12. A load weight monitoring system in accordance with claim 8, further comprising:

a plurality of communication anomaly reporting means, each communication anomaly reporting means being attached to either of a loader controller and a dump truck controller; and wherein, when a communication anomaly is judged, a controller, to which a communication anomaly reporting means is attached, reports the communication anomaly to an operator by an associated communication anomaly reporting means.

13. A load weight monitoring system for a dump truck, said system comprising:

a dump truck controller, provided for a dump truck;

a loader controller, provided for a loader and available for communicating by radio with said dump truck controller;

a weight detector, provided for said dump truck, to detect a load weight of said dump truck; and a weight display means, provided for said loader, to display said load weight through said dump controller and said loader controller and for monitoring loading operations of said dump truck and said loader;

wherein said loader is provided with a start permission input switch;

wherein said loader controller, when inputting a dump truck start permission signal from said start permission input switch, transmits said start permission signal to said dump truck controller; and wherein said dump truck controller forcibly disconnects a radio link with said loader controller when receiving said start permission signal from said loader controller.

14. A load weight monitor system for a dump truck, said system comprising:

a dump truck controller, provided for association with a dump truck;

a loader controller, provided for association with a loader and available for communicating by radio with said dump controller;

a weight detector, provided for association with said dump truck to detect a load weight of said dump truck;

a weight display means, provided for association with said loader, to display said load weight through said dump truck controller and said loader controller, and for monitoring loading operations of said dump truck and said loader;

a travel distance detector, provided for association with said dump truck, for detecting a travel distance of said dump truck; and a link disconnect judging means for inputting said detected travel distance, wherein said link disconnect judging means outputs a link disconnect request signal to said dump truck controller when the detected travel distance, after the start of a loading operation, becomes equal to or exceeds a predetermined value; and wherein said dump truck controller, which has inputted said link disconnect request signal, forcibly disconnects a radio link with said loader controller.

* * * * *

UNITED STATES PATENT AND TRADEMARK OFFICE
CERTIFICATE OF CORRECTION

PATENT NO. : 5,822,224
DATED : October 13, 1998
INVENTOR(S) : Hitoshi NAKANISHI et al It is certified that error appears in the above-identified patent and that said Letters Patent is hereby corrected as shown below:

Column 20, line 54, delete "signal inputted," and insert signal, inputted.

Column 21, line 14, after "dump" and insert truck.

Column 21, line 26, delete "monitor" and insert monitoring.

Column 22, line 5, after "dump" and insert truck.

Signed and Sealed this

Twenty-eighth Day of September, 1999

Attest:

Q. TODD DICKINSON

*Attesting Officer*  *Acting Commissioner of Patents and Trademarks*